United States Patent
Sonoda et al.

(10) Patent No.: US 9,577,488 B2
(45) Date of Patent: Feb. 21, 2017

(54) DRIVE UNIT INTEGRATED ROTATING ELECTRICAL MACHINE

(75) Inventors: Isao Sonoda, Chiyoda-ku (JP);
Yoshihito Asao, Chiyoda-ku (JP);
Mamoru Watanabe, Chiyoda-ku (JP);
Katsuhiko Omae, Chiyoda-ku (JP);
Tetsushi Watanabe, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 514 days.

(21) Appl. No.: 14/001,922

(22) PCT Filed: May 20, 2011

(86) PCT No.: PCT/JP2011/061652
§ 371 (c)(1),
(2), (4) Date: Aug. 28, 2013

(87) PCT Pub. No.: WO2012/160623
PCT Pub. Date: Nov. 29, 2012

(65) Prior Publication Data
US 2013/0334906 A1 Dec. 19, 2013

(51) Int. Cl.
*H02K 11/04* (2016.01)
*H02K 5/22* (2006.01)
*H02K 7/116* (2006.01)

(52) U.S. Cl.
CPC .............. *H02K 5/225* (2013.01); *H02K 7/116* (2013.01); *H02K 7/1166* (2013.01); *H02K 11/33* (2016.01); *H02K 11/30* (2016.01)

(58) Field of Classification Search
CPC ...... H02K 5/225; H02K 1/116; H02K 7/1166; H02K 11/0073; H02K 11/00; H02K 11/30; H02K 11/33
(Continued)

(56) References Cited

U.S. PATENT DOCUMENTS 6,411,191 B1* 6/2002 Shea ............... H01C 10/10
338/22 R
6,753,628 B1* 6/2004 Neal ............... G11B 19/2009
29/598
(Continued)

FOREIGN PATENT DOCUMENTS

EP 2261099 A1 12/2010
JP 2002-345211 A 11/2002
(Continued)

OTHER PUBLICATIONS

Communication dated Jun. 25, 2015 from the State Intellectual Property of the People's Republic of China in counterpart application No. 201180070994.9.
(Continued)

*Primary Examiner* — Quyen Leung
*Assistant Examiner* — Minki Chang
(74) *Attorney, Agent, or Firm* — Sughrue Mion, PLLC; Richard C. Turner

(57) ABSTRACT

Problem
To obtain a drive unit integrated rotating electrical machine that makes it easier to connect power circuits and achieves not only excellent vibration resistance but also excellent heat releasing properties.
Means for Solution
A drive unit integrated rotating electrical machine has a motor, a drive unit driving the motor under control and provided with power switching elements and conductors passing a current to the power switching elements, and a heat sink cooling the drive unit, which are combined into one unit. The drive unit integrated rotating electrical machine is characterized in that: the power switching elements are molded and formed into mold modules in a state in which terminals thereof are exposed; the conductors are insert-molded in a frame in a state in which terminals thereof (Continued)

are exposed; and the exposed terminals of the mold modules are connected to the exposed terminals of the insert-molded conductors and the mold modules are firmly fixed to the heat sink.

23 Claims, 12 Drawing Sheets

(58) Field of Classification Search
USPC .......... 310/43; 701/42; 361/784; 318/400.01
See application file for complete search history.

(56) References Cited

U.S. PATENT DOCUMENTS

| | | | |
|---|---|---|---|
| 2002/0060105 A1 | 5/2002 | Tominaga et al. | |
| 2004/0183385 A1* | 9/2004 | Takahashi | H01L 23/3672 310/68 D |
| 2007/0205038 A1* | 9/2007 | Tominaga | B62D 5/0406 180/444 |
| 2009/0237905 A1* | 9/2009 | Motoda | H05K 1/144 361/784 |
| 2010/0127712 A1* | 5/2010 | Miya | G01R 31/2867 324/537 |
| 2010/0308700 A1 | 12/2010 | Isoda et al. | |
| 2011/0066332 A1* | 3/2011 | Sonoda | B62D 5/0406 701/42 |
| 2012/0286603 A1* | 11/2012 | Suga | H02K 11/33 310/71 |

FOREIGN PATENT DOCUMENTS

| | | | | |
|---|---|---|---|---|
| JP | 2003-174780 A | 6/2003 | | |
| JP | 2004-282905 A | 10/2004 | | |
| JP | 2009-232512 A | 10/2009 | | |
| JP | WO 2010007672 A1 * | 1/2010 | .......... | B62D 5/0406 |
| JP | 2010-157563 A | 7/2010 | | |
| WO | 2010/007672 A1 | 1/2010 | | |

OTHER PUBLICATIONS

Communication dated Feb. 15, 2016, from the European Patent Office in counterpart European Application No. 11866289.9.

* cited by examiner

DRIVE UNIT INTEGRATED ROTATING ELECTRICAL MACHINE

CROSS REFERENCE TO RELATED APPLICATIONS

This application is a National Stage of International Application No. PCT/JP2011/061652filed May 20, 2011, the contents of all of which are incorporated herein by reference in their entirety.

TECHNICAL FIELD

The present invention relates to a drive unit integrated rotating electrical machine employed in an electric power steering device or the like.

BACKGROUND ART

A drive unit integrated rotating electrical machine in the related art employed in an electric power steering device or the like uses a ceramic board as a drive board in a drive unit part (see, for example, PTL 1). Further, drive semiconductor switching elements (for example, MOS-FETs) are mounted by bare chip mounting on the ceramic board, which is the drive board (see, for example, PTL 1 and PTL 2).

CITATION LIST

Patent Literature

PTL 1: JP-A-2010-12819 (page 1 and FIG. 2)

SUMMARY OF INVENTION

Technical Problem

The drive unit integrated rotating electrical machine in the related art described in PTL 1 uses a ceramic board as the drive board and drive semiconductor switching elements are generally mounted on the ceramic board by bare chip mounting.

The drive unit integrated rotating electrical machine is formed as follows. That is, the semiconductor switching elements are mounted on a ceramic board and this ceramic board is installed to a heat sink, for example, by soldering. Then, after a frame assembly (assembled body) (hereinafter, referred to as the frame ASSY), which is provided with terminals to feed power to the semiconductor switching elements and a control terminal portion of the semiconductor switching elements, is attached to the heat sink, the semiconductor switching elements are connected to the frame ASSY one by one using, for example, aluminum wires.

Hence, there is a problem that productivity is poor.

Further, the ceramic board is fixed to the heat sink, for example, by soldering, and cracking occurs in the solder over temperature cycles in use. Hence, there is a problem that thermal resistance between the ceramic substrate and the heat sink becomes larger.

Furthermore, there is a problem that the ceramic board comes off from the heat sink because of environmentally-induced vibrations.

The present invention solves the problems as above and has an object to obtain a drive unit integrated rotating electrical machine that makes it easier to connect drive semiconductor switching elements and a frame ASSY provided with power feeding terminals and also achieves excellent vibration resistance.

Solution to Problem

A drive unit integrated rotating electrical machine according to the invention omits a drive board and instead has a rotating electrical machine, a drive unit driving the rotating electrical machine under control and provided with power switching elements and conductors passing a current to the power switching elements, and a heat sink cooling the drive unit, which are combined into one unit. The power switching elements are molded and formed into mold modules with terminals thereof being exposed. The conductors are insert-molded in a frame with terminals thereof being exposed. The exposed terminals of the mold modules are connected to the exposed terminals of the insert-molded conductors and the mold modules are firmly fixed to the heat sink.

Advantageous Effects of Invention

According to the invention, it becomes possible to obtain a drive unit integrated rotating electrical machine that makes it easier to connect mold modules in which power switching elements are molded with the terminals thereof being exposed and respective terminals of a frame in which conductors passing a current to the power switching elements are insert-molded and also enhances vibration resistance.

DESCRIPTION OF EMBODIMENTS

First Embodiment

Figure 1:
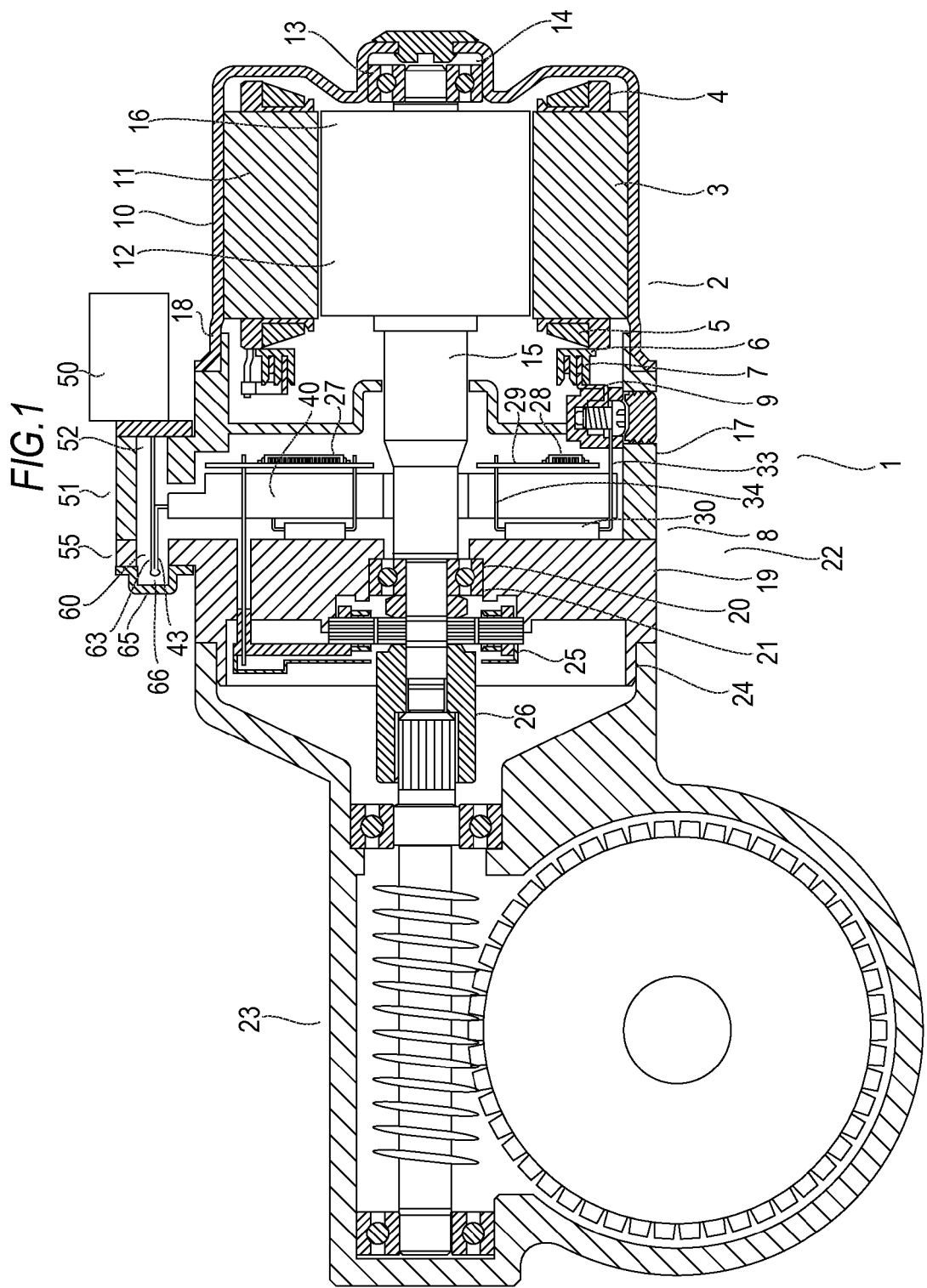
FIG. 1 is a cross section including a speed reducer and showing a drive unit integrated rotating electrical machine according to a first embodiment of the invention.
Figure 2:
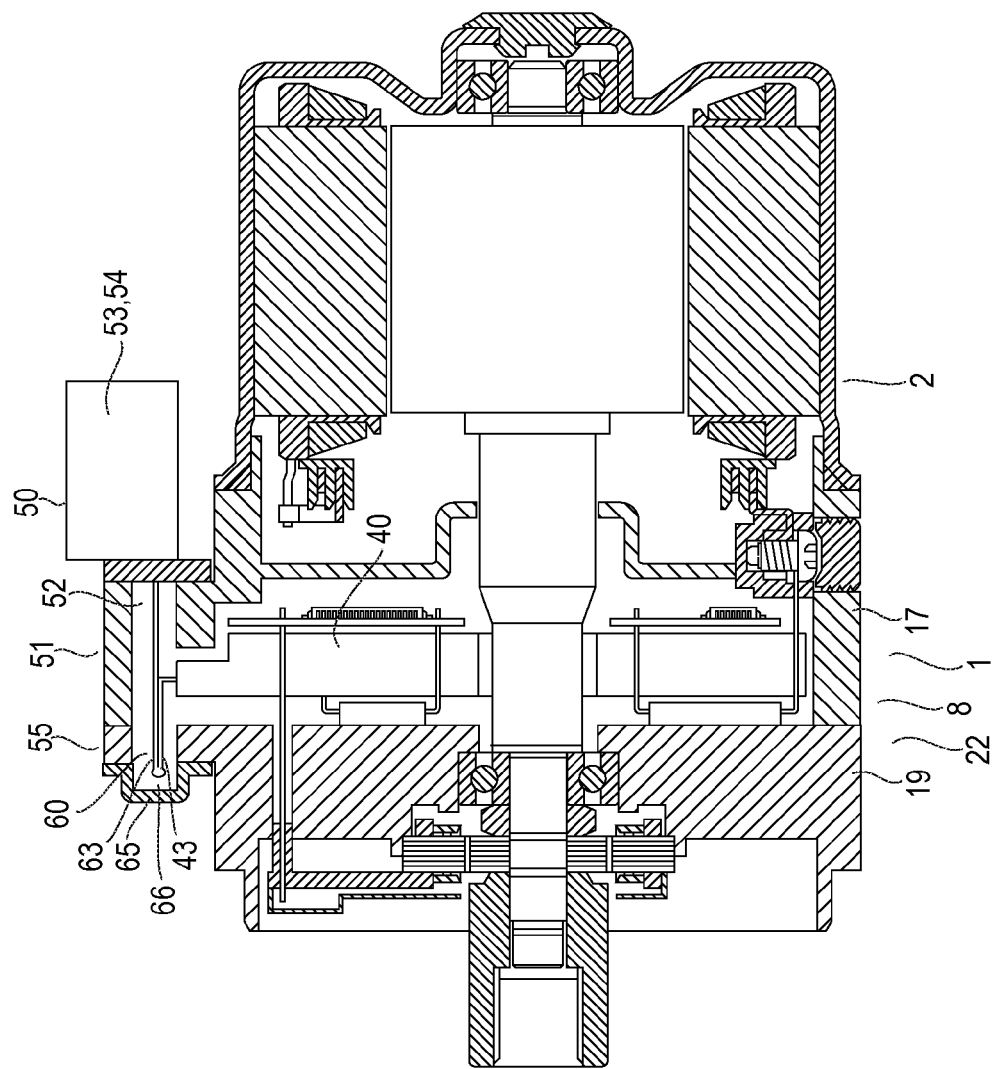
FIG. 2 is an axial cross section showing the drive unit integrated rotating electrical machine according to the first embodiment of the invention.
Figure 3:
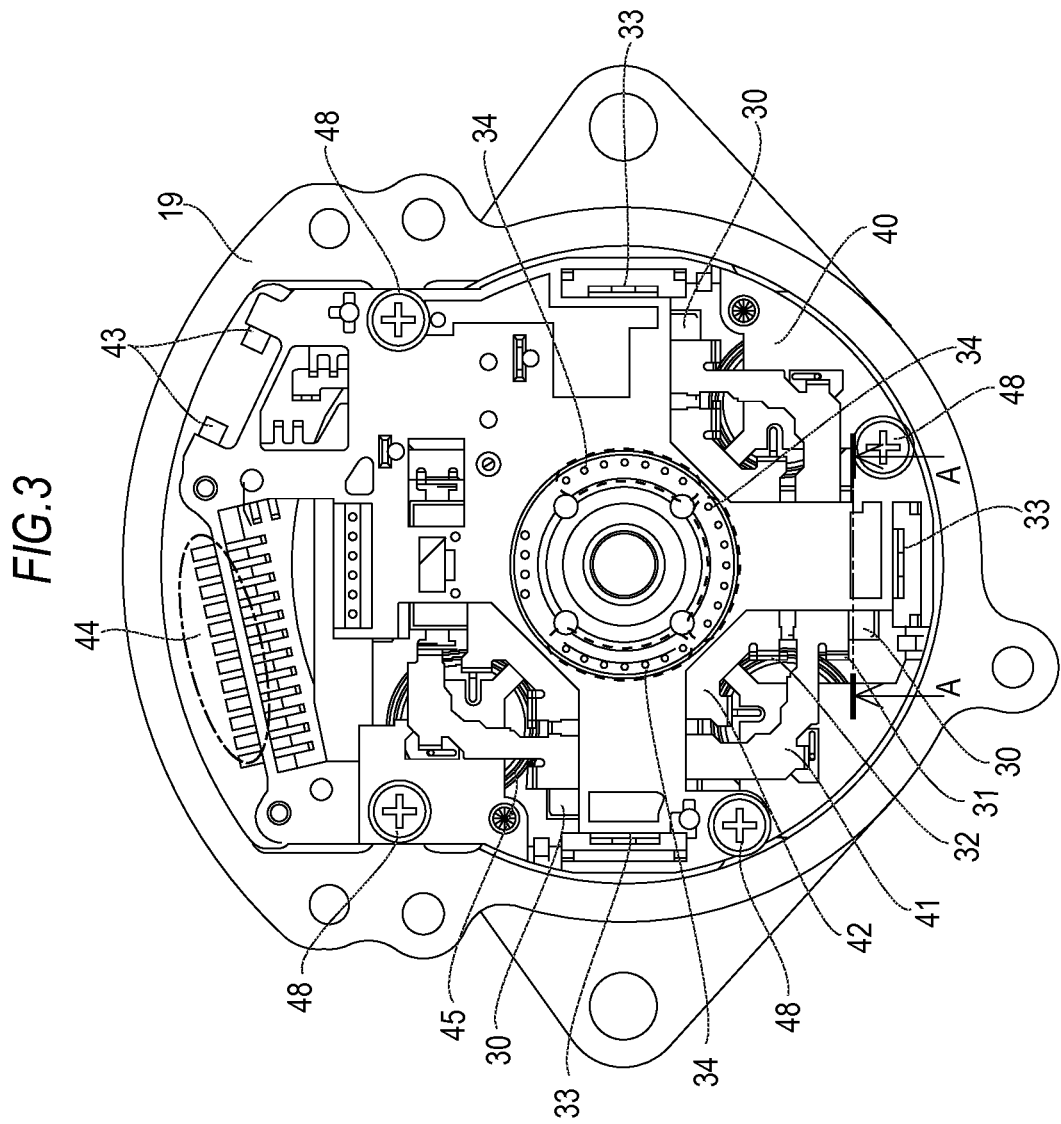
FIG. 3 is a top view omitting a housing and a control board of a drive unit part and showing the drive unit integrated rotating electrical machine according to the first embodiment of the invention.
Figure 4:
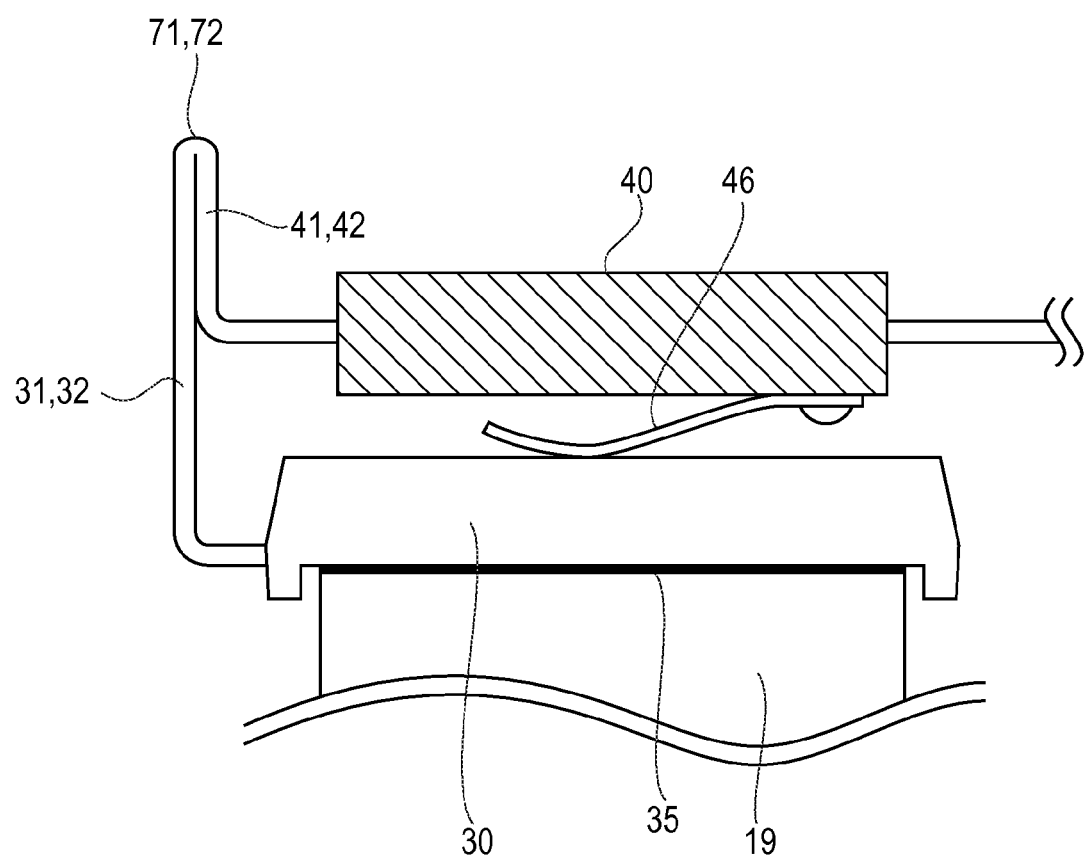
FIG. 4 is a partial cross section of a heat sink, a mold module, and a frame ASSY on section A-A of FIG. 3 to show the drive unit integrated rotating electrical machine according to the first embodiment of the invention.

Hereinafter, a first embodiment of the invention will be described using FIG. 1 to FIG. 3 and FIG. 10 to FIG. 12. FIG. 1 is a cross section showing a drive unit integrated rotating electrical machine according to the first embodiment of the invention and a speed reducer. FIG. 2 is an axial cross section showing the drive unit integrated rotating electrical machine of the invention. FIG. 3 is a cross section of a drive unit part showing the drive unit integrated rotating electrical machine of the invention. FIG. 4 is a partial cross section of a heat sink, a mold module, and a frame ASSY on section A-A of FIG. 3 to show the drive unit integrated rotating electrical machine of the invention. A drive unit 8 uses a mold module for a power switching element FETps, a motor relay FETry, and a power-supply relay RyM in each phase, that is, a phase U, a phase V, and a phase W. FIG. 4 shows a cross section of the phase V as a representative and omits cross sections of the other phases. It should be appreciated, however, that the other phases are of the same configuration as the phase V.

Referring to FIG. 1 to FIG. 4, a rotating electrical machine 2 is a permanent magnet synchronous motor and a three-phase stator winding 5 is wound around a stator core 3 formed of a lamination of magnetic steel sheets via a resin insulator 4. Wirings of the respective phases are wye- or delta connected by a winding terminal 7 stored in a resin terminal holder 6.

A motor terminal 9 to establish an electrical connection with the drive unit 8 is attached to the winding terminal 7.

The stator core 3 is press-fit in an iron frame 10 and forms a stator 11 of the motor.

There is a bottom portion at one end of the frame 10 and a rear bearing box portion 14 in which to store a rear bearing 13 supporting one end of a rotor 12 is formed at a center of the bottom portion.

A magnet 16 generating a magnetic field is attached along an outer peripheral portion of a shaft 15 of the rotor 12.

The other end of the frame 10 is open and provided with a mating portion 18 to couple the frame 10 to a housing 17 of the drive unit 8.

The housing 17 is formed of a die cast molded article made of aluminum alloy and joined to a heat sink 19 of the drive unit 8 at one end.

The heat sink 19 is formed of a die cast molded article made of aluminum alloy. A front bearing box portion 21 in which to store a front bearing 20 supporting one end of the rotor is formed at a center of the heat sink.

The housing 17 and the heat sink 19 together form a drive unit storing portion 22.

An attachment mating portion 24 to attach the heat sink 19 to a speed reducer 23 is provided at the other end of the heat sink 19.

A resolver, which is a rotation sensor 25, is attached to the heat sink 19 at the center on the front side.

A boss 26, which is a coupling to couple the shaft 15 to the speed reducer 23, is attached to the shaft 15 at an end on the front side.

The drive unit 8 has a control board 29 made of glass epoxy on which a micro-computer 27 and an FET drive circuit 28 are mounted and mold modules (semiconductor packages) 30 molded from resin and on which power elements (semiconductor switching elements), such as power MOSFETs, are mounted. A frame ASSY 40 is provided between the control board 29 and the mold modules 30. Battery potential copper terminals B (hereinafter, referred to as the terminals B) 41 to supply power to the mold modules 30 and ground potential terminals G (hereinafter, referred to as the terminal G) 42 are insert-molded with resin and formed integrally with the frame ASSY 40. The frame ASSY 40 is fixed to the heat sink 19 with frame ASSY fixing screws 48.

Each mold module 30 is pressed parallel to and against an mold module attachment surface of the heat sink 19 uniformly across the entire surface as the center portion of the mold module 30 is pressed by an elastic material 46 attached to the frame ASSY 40 and is therefore attached in close contact with an inner wall of the heat sink 19 via resin 35. Hence, it is configured in such a manner that heat generated in the power elements in the mold modules 30 is transferred to the heat sink 19.

Also, the mold module 30 is provided with a terminal (hereinafter, referred to as the terminal MB) 31 of battery potential in the mold module 30 to feed power to the internal power MOSFET, a terminal (hereinafter, referred to as the terminal MG) 32 of ground potential in the mold module 30, mold module signal terminals 34 to control the power MOSFET, and a mold module motor terminal 33 to feed power from the mold module 30 to the motor.

The mold module signal terminals 34 are connected to the control board 29 and the mold module motor terminal 33 is connected to the motor terminal 9.

After the mold modules 30 are installed to the heat sink 19 using the frame ASSY 40, the terminals MB 31 and the terminals MG 32 are joined, respectively, to the terminals B 41 and the terminals G 42 of the frame ASSY 40, respectively, by welds 71 and 72.

The heat sink 19 stores therein a capacitor 45 absorbing ripples of a current flown to the rotating electrical machine 2 and is connected to the mold modules 30 via the terminals B 41 and the terminals G 42 of the frame ASSY 40. The heat sink 19 also stores an unillustrated coil absorbing noises and is connected to a connector portion 50 via the terminals B 41 of the frame ASSY 40.

The housing 17 is provided with a housing radially protruding portion 51. A housing axially opening portion 52, which is a connector attachment portion, is provided at an axial end of the housing radially protruding portion 51. The connector portion 50 is attached to the housing axially opening portion 52 and the connector portion 50 is provided with a power-supply connector 53 and a signal connector 54.

The heat sink 19 is provided with a heat sink radially protruding portion 55 at an opposing position to the housing radially protruding portion 51 and with a heat sink opening portion 60 at an axial end of the heat sink radially protruding portion 55.

Power-supply terminals 43 and signal terminals 44 extending from the frame ASSY 40 protrude axially from the heat sink opening portion 60.

The power-supply terminals 43 and the signal terminals 44 are connected to the respective corresponding terminals, that is, the power-supply connector terminal 53 and the signal connector terminal 54 extending from the connector portion 50 to the housing axially opening portion 52, by welding or the like at positions at which the power-supply terminals 43 and the signal terminals 44 protrude axially from the heat sink opening portion 60.

A cover 65 is provided to the heat sink opening portion 60. The cover 65 covers a connector connection portion 66 including connection portions between the power-supply terminals 43 and the power-supply connector terminals 63 and connection portions between the signal terminals 44 and signal connector terminals 64. Airtight and waterproof sealing by seal resin is applied to a contact surface of the cover 65 and the heat sink 19 when a need arises.

Figure 10:
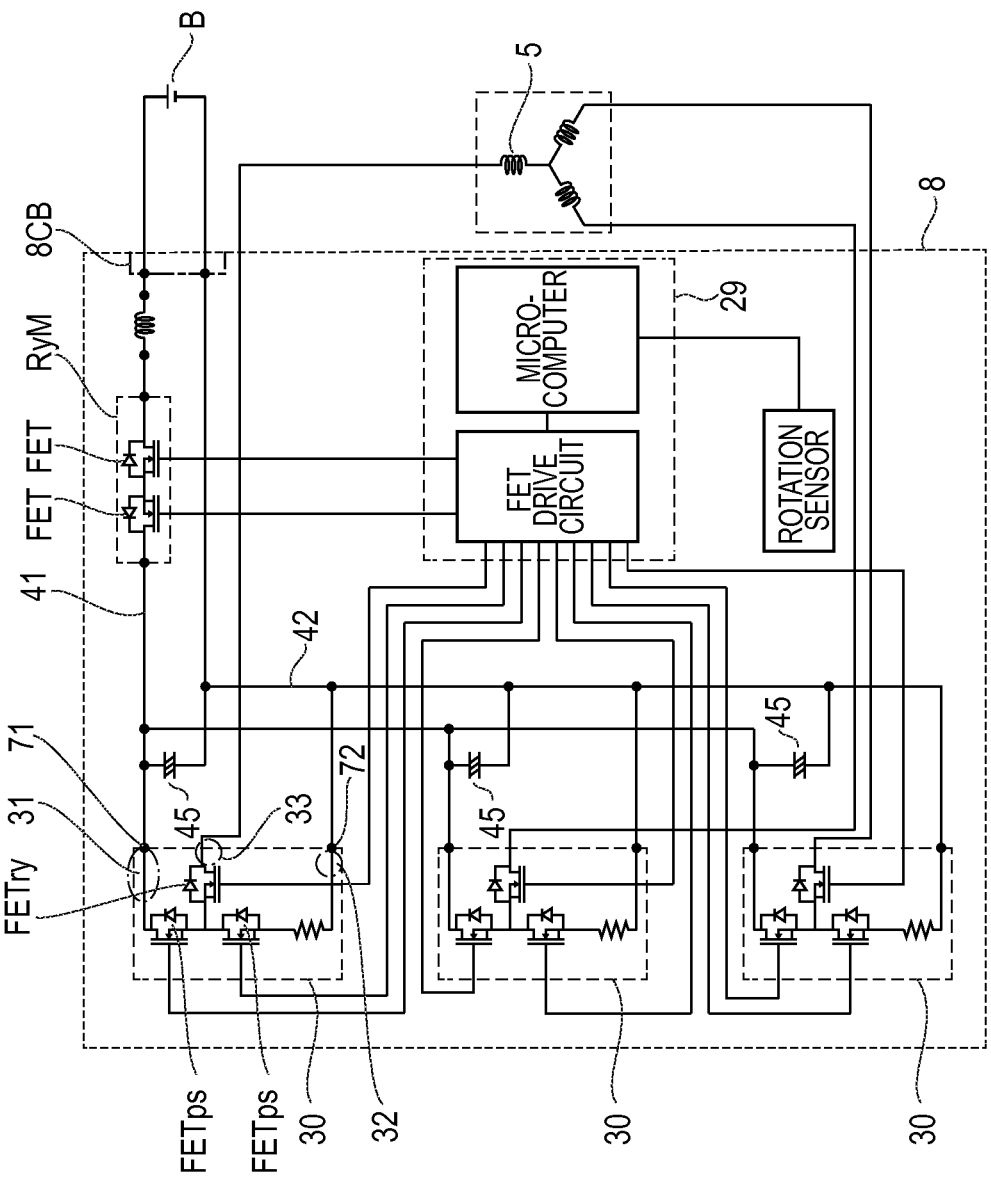
FIG. 10 is a circuit diagram of the drive unit integrated rotating electrical machine according to the first embodiment of the invention.
Figure 11:
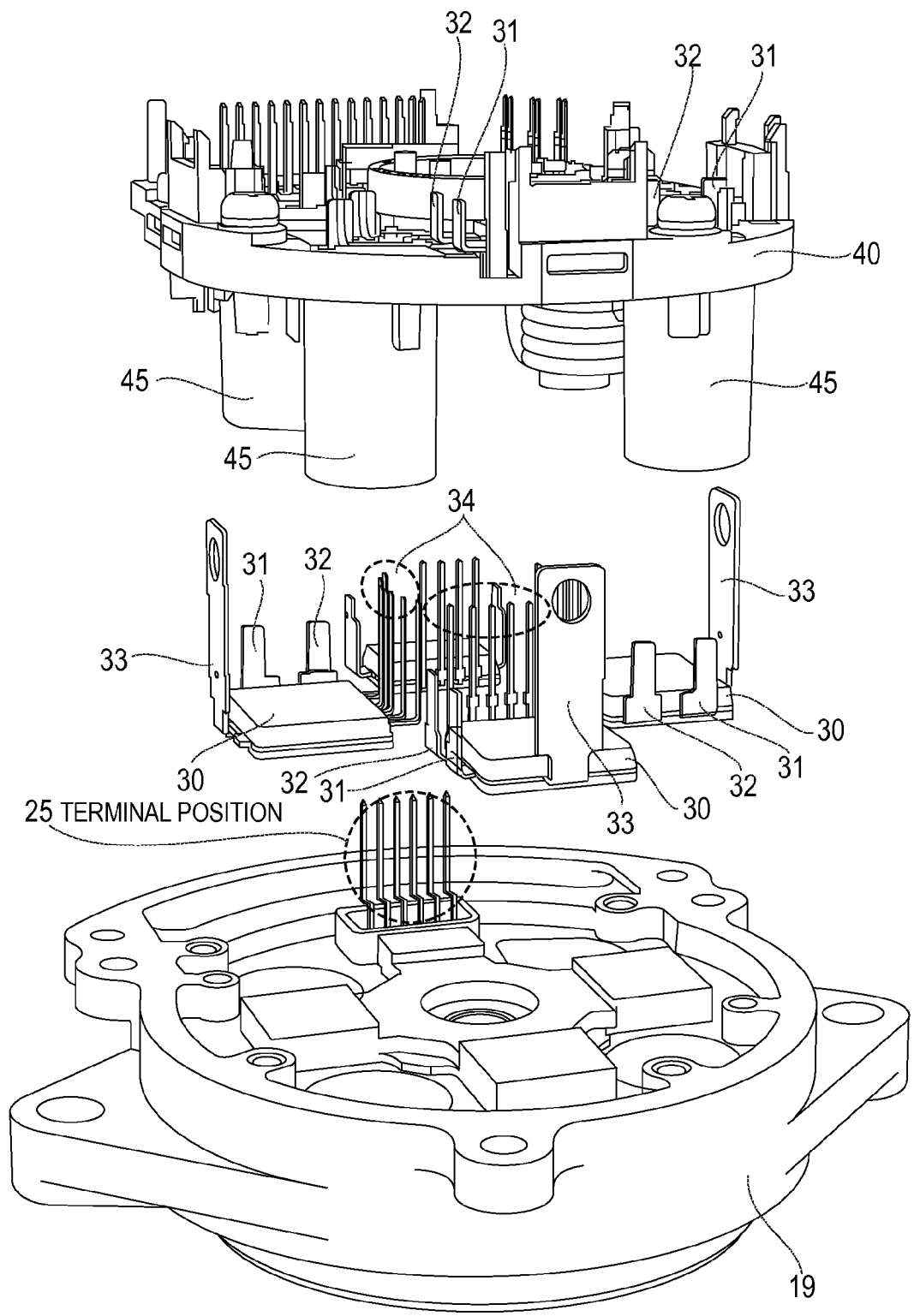
FIG. 11 is a developed view omitting a housing and a control board of a drive unit part and showing the drive unit integrated rotating electrical machine according to the first embodiment of the invention.
Figure 12:
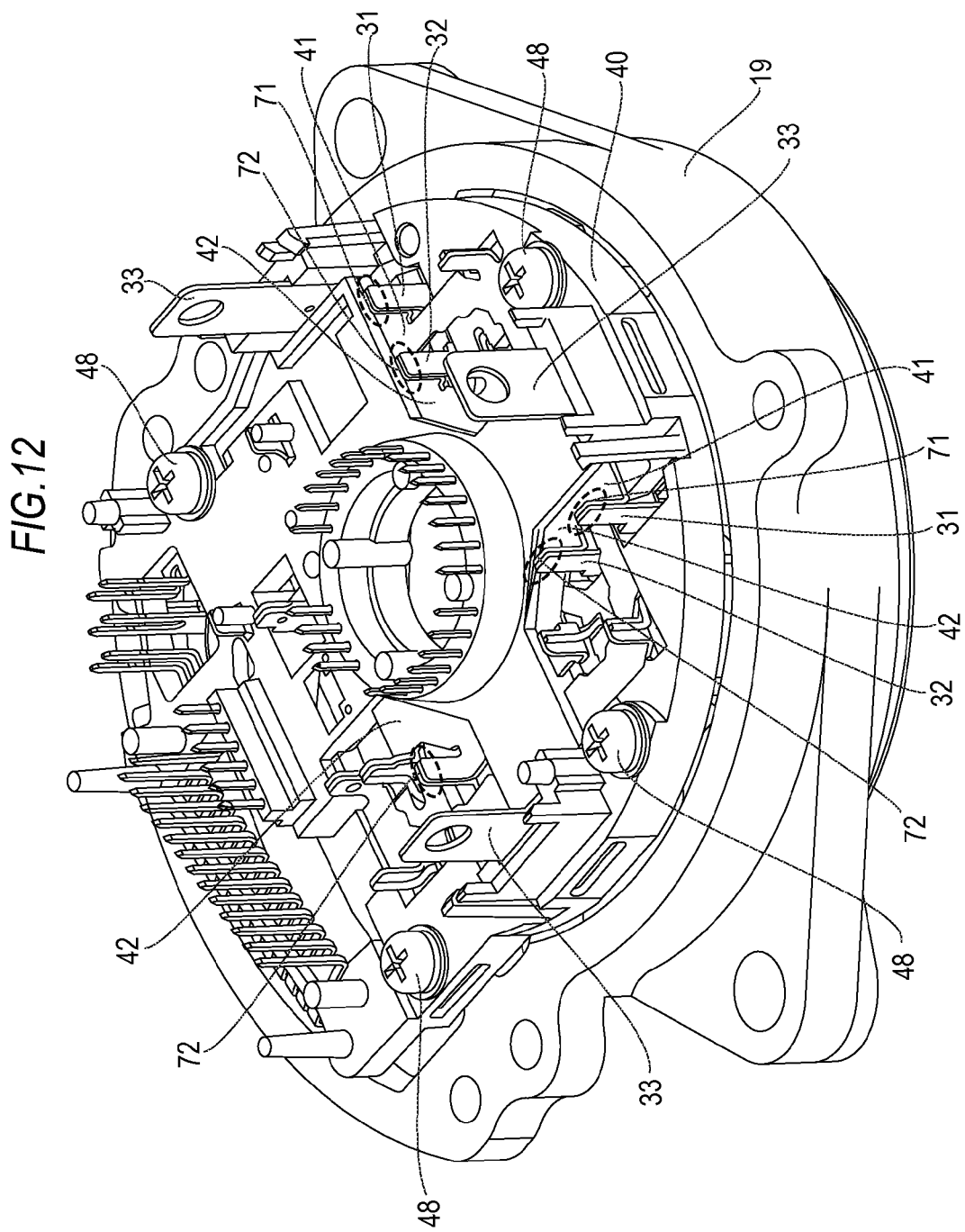
FIG. 12 is a perspective view omitting a housing and a control board of a drive unit part and showing the drive unit integrated rotating electrical machine according to the first embodiment of the invention.

In FIG. 10, alpha-numeral 8CB denotes a power-supply connector portion which connects the drive circuit 8 and a battery B and is provided to the drive circuit 8.

In the drive-unit integrated rotating electrical machine configured in this manner, the mold modules 30 are pressed at the center portions of the mold modules 33 by the elastic materials 46 attached to the frame ASSY 40, so that the terminals MB 31 and the terminals MG 32 are joined, respectively, to the terminals B 41 and the terminals G 42 of the frame ASSY 40, respectively, by the welds 71 and 72 in a state in which the mold modules 30 are pressed uniformly, parallel to and against the attachment surface of heat sink. Further, because the mold modules 30 are firmly fixed to the heat sink 19 with the resin 35, heat generated in the mold modules 30 can be transferred to the heat sink 19 homogeneously and more excellent vibration resistance can be achieved. Furthermore, because connection by welding is easier than by wire bonding in the related art, excellent productivity can be achieved.

In addition, the drive unit integrated rotating electrical machine includes the drive unit 8 formed of the heat sink 19 on which the power circuits are mounted and the housing 17 containing internal components, and the rotating electrical machine 2 formed of the stator 11 and the rotor 12, which are combined into one unit sequentially from the attachment side of the speed reducer 23 substantially coaxially with the rotation shaft of the rotor 12. Hereinafter, a rotating electrical machine configured in this manner is referred to as the drive unit integrated rotating electrical machine. According to this configuration, the mold modules 30 receive vibrations from the rotating electrical machine in the coaxial integral structure. However, the mold modules 30 are pressed against the heat sink 19 by the frame ASSY 40, and the heat sink 19 is attached to the speed reducer 23, which is a fixed point. Hence, the mold modules 30 are advantageous in vibration resistance. In addition, because the heat sink 19 on which are mounted the mold modules 30 is attached to the speed reducer 23, heat generated in the mold modules 30 is readily transferred to the speed reducer 23. Hence, excellent heat releasing properties can be achieved.

Second Embodiment

Figure 5:
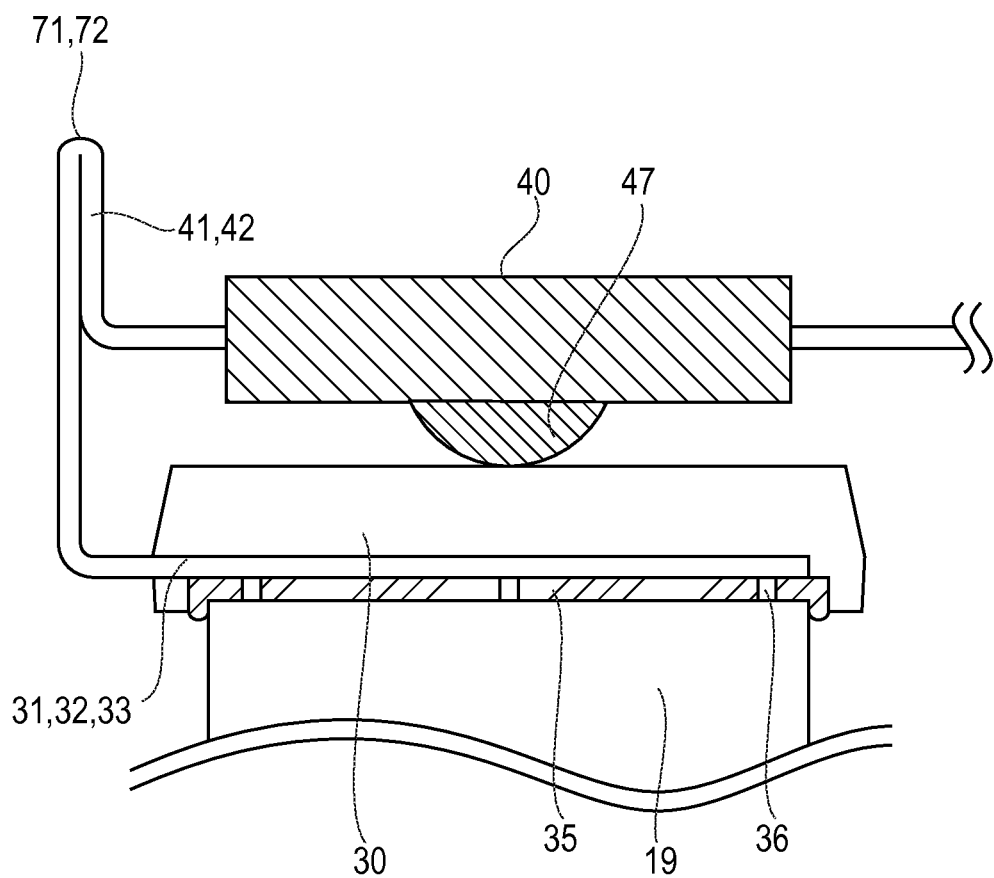
FIG. 5 is a partial cross section of a heat sink, a mold module, and a frame ASSY on section A-A of FIG. 3 to show a drive unit integrated rotating electrical machine according to a second embodiment of the invention.
Figure 6:
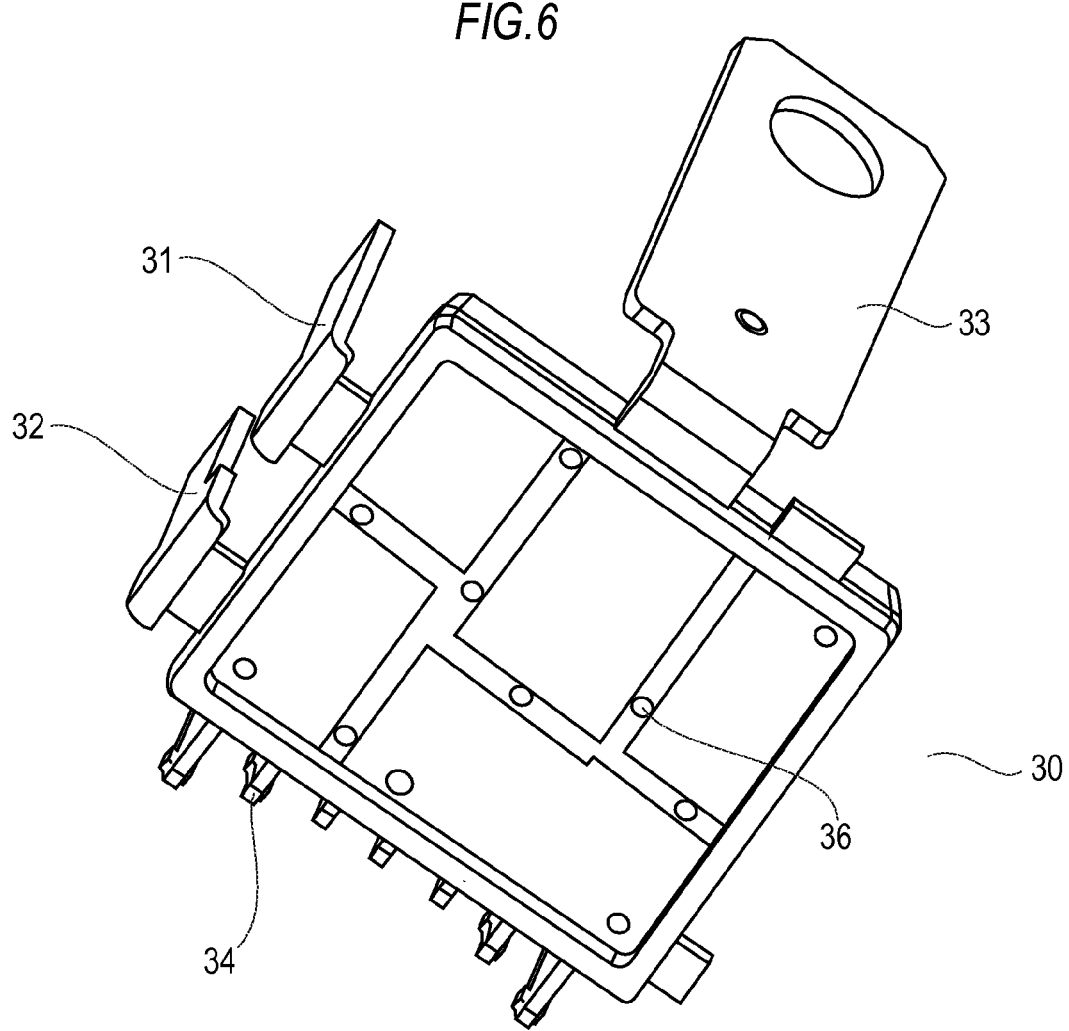
FIG. 6 is a perspective view of a mold module back surface to show the drive unit integrated rotating electrical machine according to the second embodiment of the invention.

A second embodiment of the invention will now be described using FIG. 5. FIG. 5 is a partial cross section of the heat sink 19, the mold module 30, and the frame ASSY 40 on the section A-A of FIG. 3 to show a drive unit coaxially integrated rotating electrical machine according to the second embodiment of the invention. The drive unit 8 uses a mold module for a power switching element FETps, a motor relay FETry, and a power-supply relay RyM in each phase, that is, a phase U, a phase V, and a phase W. FIG. 5 shows a cross section of the phase V as a representative and omits cross sections of the other phases. It should be appreciated, however, that the other phases are of the same configuration as the phase V. FIG. 6 is a perspective view of the mold module 30 of FIG. 5 showing a surface mounted onto the heat sink 19. In comparison with the counterpart of the first embodiment above, the drive unit coaxially integrated rotating electrical machine of the second embodiment is different in the configuration of a part described in the following.

Mold module back surface protruding portions 36 are provided to the attachment surface to the heat sink 19 of each mold module 30 mounted on the top surface of the heat sink 19. The terminal MB 31, the terminal MG 32, and the mold module motor terminal 33 of the mold module are exposed to the attachment surface to the heat sink 19 of the mold module 30.

Also, frame ASSY protruding portions 47 of substantially a spherical shape are provided to the frame ASSY 40. The frame ASSY 40 is attached to the heat sink 19 in a state in which the frame ASSY protruding portions 47 are in contact with the mold modules 30.

In a state in which the frame ASSY protruding portions 47 of the frame ASSY 40 are in contact with the mold modules 30, the frame ASSY 40 and the heat sink 19 have a clearance in between. When the frame ASSY 40 is fixed to the heat sink 19 with the frame ASSY fixing screws 48, the frame ASSY 40 undergoes deflection and the frame ASSY 40 and the heat sink 19 come into contact with each other. In this instance, the mold modules 30 are pressed against the heat sink 19 by the frame ASSY protruding portions 47 of the frame ASSY 40.

Resin 35 is present between the mold modules 30 and the heat sink 19 so as to transfer heat of the mold modules 30 to the heat sink 19. The resin 35 is hardening resin.

Also, an insulating layer is provided to the heat sink 19 on the surface on which the mold modules 30 are mounted.

Also, the resin 35 is applied in an amount large enough to overflow to the outer peripheral portion of the mold module 30 from the surface abutted on the heat sink 19.

In the drive unit coaxially integrated rotating electrical machine configured in this manner, the mold modules 30 are fixed to the heat sink 19 with the resin 35 by providing the mold module back surface protruding portions 36 so as to produce a clearance of a uniform thickness between the mold modules 30 and the heat sink 19. It thus becomes possible to release heat generated in a plurality of switching elements in each mold module 30 to the heat sink 19 homogeneously.

In a case where the clearance has a non-uniform thickness, heat is released inhomogeneously from a plurality of the switching elements in the mold module 30 and temperatures of the switching elements become equal. In order to prevent overheating of the mold module 30, heat generation of the switching elements is lowered by suppressing a current flowing through the switching elements when any one of the switching elements reaches a maximum temperature so as to protect the switching element reaching the maximum temperature from breaking. Hence, a current is suppressed even when the other switching elements have a margin of temperature from the maximum temperature.

When the clearance is made uniform, variances in temperature among the respective switching elements can be lessened by making thermal resistances from the respective switching elements to the heat sink 19 equal. It thus becomes possible to enhance an output and extend an operating time of the drive unit coaxially integrated rotating electrical machine.

Further, because temperatures of the respective switching elements can be equal, it becomes possible to enhance reliability of the switching elements.

Further, the attachment surface to the heat sink 19 of the mold module 30 is provided with the protrusions of a uniform height made of resin from which the mold module is molded. Hence, a clearance can be secured between the mold module and the heat sink. Also, because it is no longer necessary to control the clearance to be uniform at the end of the facility, the machinability can be enhanced.

Also, the mold modules 30 are attached to the heat sink 19 as substantially the center portions of the mold modules 30 are pressed by point contact using the protrusions of substantially a spherical shape provided to the frame ASSY 40. It thus becomes possible to press the mold modules 30 against the heat sink 19 via the protrusions of the mold modules 30 in such a manner that a clearance between the heat sink 19 and the mold modules 30 becomes uniform while preventing the mold modules 30 from tilting with respect to the attachment surface of the heat sink 19. In comparison with a case where the elastic members are provided between the mold modules 30 and the frame ASSY 40, the elastic members can be omitted and the machinability can be enhanced. In addition, because the mold modules 30 are pressed by the frame ASSY 40, vibration resistance can be enhanced further.

The respective electrodes of the terminal MB 31, the terminal MG 32, and the mold module motor terminal 33 of the mold module 30 are exposed to the heat sink attachment surface of the mold module 30 and are therefore in direct contact with the resin 35. It thus becomes possible to lower thermal resistances between the respective switching elements and the heat sink 19. This capability is advantageous in heat releasing properties.

Also, the resin 35 between the mold modules 30 and the heat sink 19 is hardening resin herein. In a case where conductive foreign matter is mixed with the resin, a product becomes defective when a short circuit occurs between the electrode from which the foreign matter is exposed and the heat sink 19. However, by checking the occurrence of a short circuit after the resin is hardened, defective products can be removed during the fabrication process. Also, because an adhesive is hardened and the foreign matter is fixed therein, should the foreign matter be mixed with the resin, a short circuit does not occur once the products are determined as being non-defective products by a check after the resin is hardened. Hence, reliability can be enhanced.

In addition, because the mold modules 30 are fixed to the heat sink 19 more firmly by the hardening of the resin, vibration resistance can be enhanced, too.

Further, the insulating layer (for example, alumite) is provided to the heat sink 19 on the surface on which the mold modules 30 are mounted. Owing to this configuration, should the mixing of air bubbles give rise to a void in a layer of the resin 35 between the mold modules 30 and the heat sink 19, the presence of the insulating layer can ensure electrical insulation between the mold modules 30 and the heat sink 19. Hence, reliability can be enhanced further.

Further, the resin 35 is applied in an amount large enough to overflow from the outer periphery of the attachment surface to the heat sink 19 of the mold module 30. Accordingly, the resin 35 can be applied to the entire attachment surface to the heat sink 19 of the mold module 30 in a reliable manner. In addition, because the resin 35 overflows from the outer peripheral portion of the mold module 30, it becomes possible to confirm that the resin is applied to the entire surface in a reliable manner. The products can be therefore manufactured in a stable manner.

Third Embodiment

Figure 7:
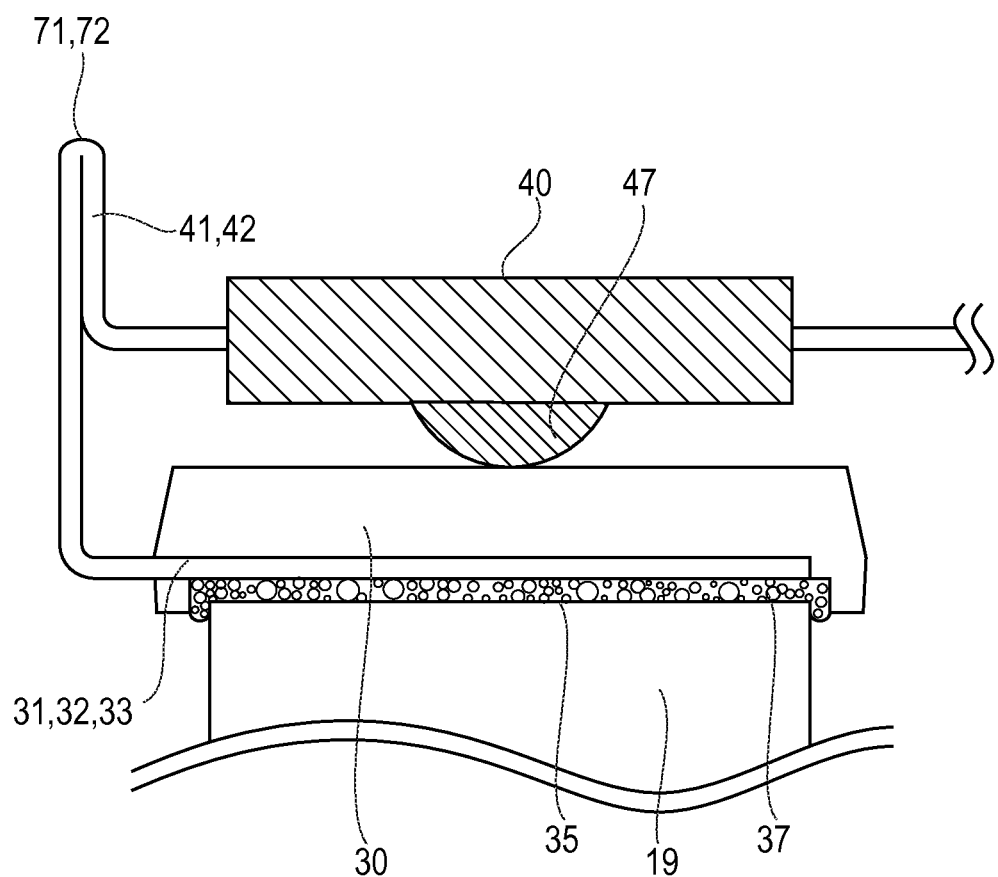
FIG. 7 is a partial cross section of a heat sink, a mold module, and a frame ASSY on section A-A of FIG. 3 to show a drive unit integrated rotating electrical machine according to a third embodiment of the invention.

A third embodiment of the invention will now be described using FIG. 7. FIG. 7 is a partial cross section of the heat sink, the mold module, and the frame ASSY on the section A-A of FIG. 3 and shows a drive unit coaxially integrated rotating electrical machine according to the third embodiment of the invention. The drive unit 8 uses a mold module for a power switching element FETps, a motor relay FETry, and a power supply relay RyM in each phase, that is, a phase U, a phase V, and a phase W. FIG. 7 shows a cross section of the phase V as a representative and omits cross sections of the other phases. It should be appreciated, however, that the other phases are of the same configuration as the phase V. In comparison with the counterparts of the first and second embodiments above, the drive unit coaxially integrated rotating electrical machine of the third embodiment is different in the configuration of a part described in the following.

In the third embodiment, mold module back surface protruding portions like those in the second embodiment above are not provided to the attachment surface to the heat sink 19 of the mold module 30 and the resin 35 between the mold module 30 and the heat sink 19 include fillers 37 therein.

The fillers 37 are furnished with a function of enhancing heat transfer. In addition, owing to the fillers 37, the clearance between the mold modules 30 and the heat sink 19 can be provided as a uniform clearance according to sizes of the fillers 37.

The fillers 37 include the ones of a small size and the ones of a large size and the fillers of the maximum size are distributed homogeneously within in the resin 35. The clearance can be provided substantially uniformly by the fillers 37. It thus becomes possible to release heat generated in a plurality of the switching elements in the mold module 30 to the heat sink 19 homogeneously.

Also, variances in temperature among the respective switching elements can be lessened by making thermal resistances from the respective switching elements to the heat sink 19 equal. It thus becomes possible to enhance an output and extend an operating time of the drive unit coaxially integrated rotating electrical machine.

The other advantages are the same as those of the second embodiment above.

Fourth Embodiment

Figure 8:
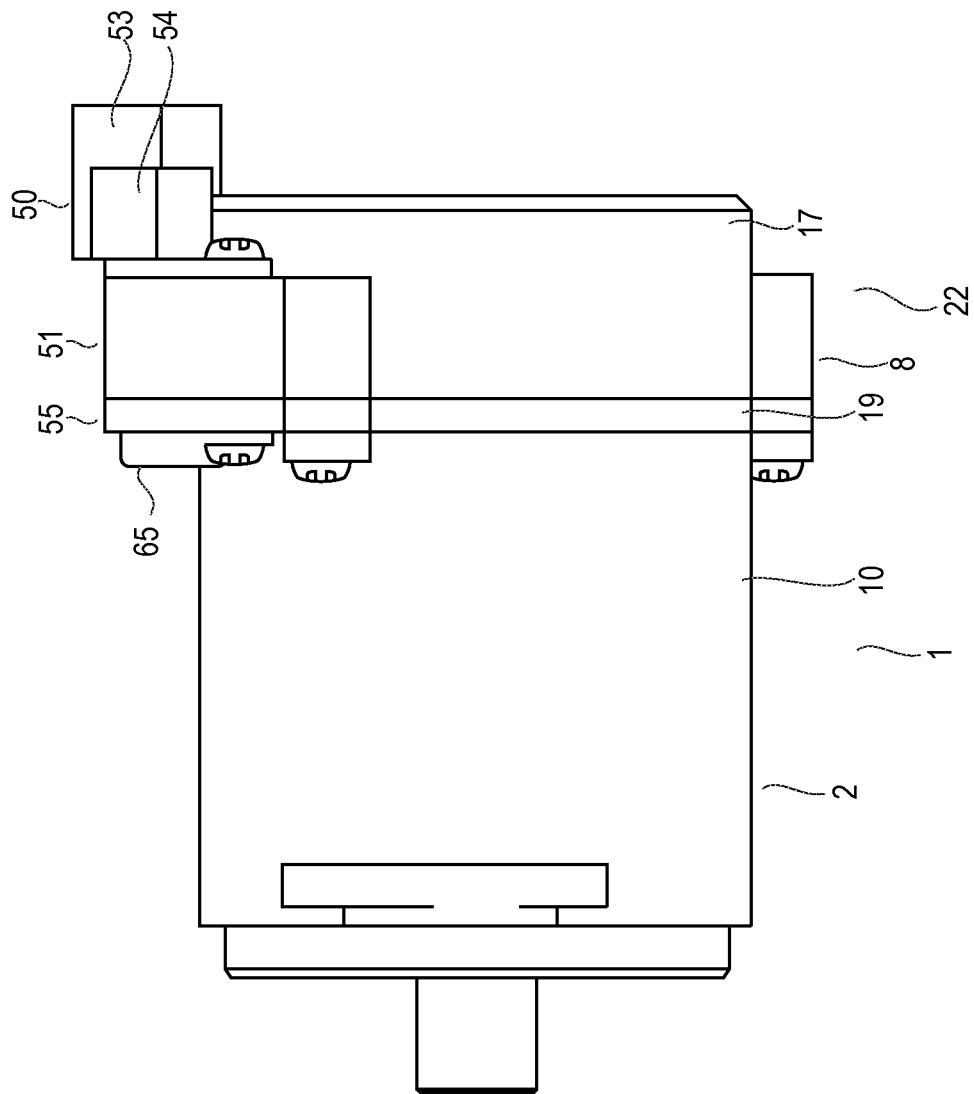
FIG. 8 is a side view showing a drive unit integrated rotating electrical machine according to a fourth embodiment of the invention.

A fourth embodiment of the invention will now be described using FIG. 8. FIG. 8 is a side view showing a drive unit coaxially integrated rotating electrical machine according to the fourth embodiment of the invention. In comparison with the counterparts of the first to third embodiments above, the drive unit coaxially integrated rotating electrical machine of the fourth embodiment is different in configuration in a part described in the following.

In the fourth embodiment, the drive unit coaxially integrated rotating electrical machine is formed to have a coaxial integral structure having a motor part and a drive unit part combined sequentially in this order from the side of the speed reducer 23.

In the drive unit coaxially integrated rotating electrical machine configured in this manner, the mold modules 30 are attached at positions farther from the attachment portion of the speed reducer 23 in the coaxial integral structure. This configuration is disadvantageous in terms of vibrations. However, the mold modules 30 are attached to the heat sink 19 with resin and, moreover, pressed by the frame ASSY 40. Hence, excellent vibration resistance can be achieved.

Fifth Embodiment

Figure 9:
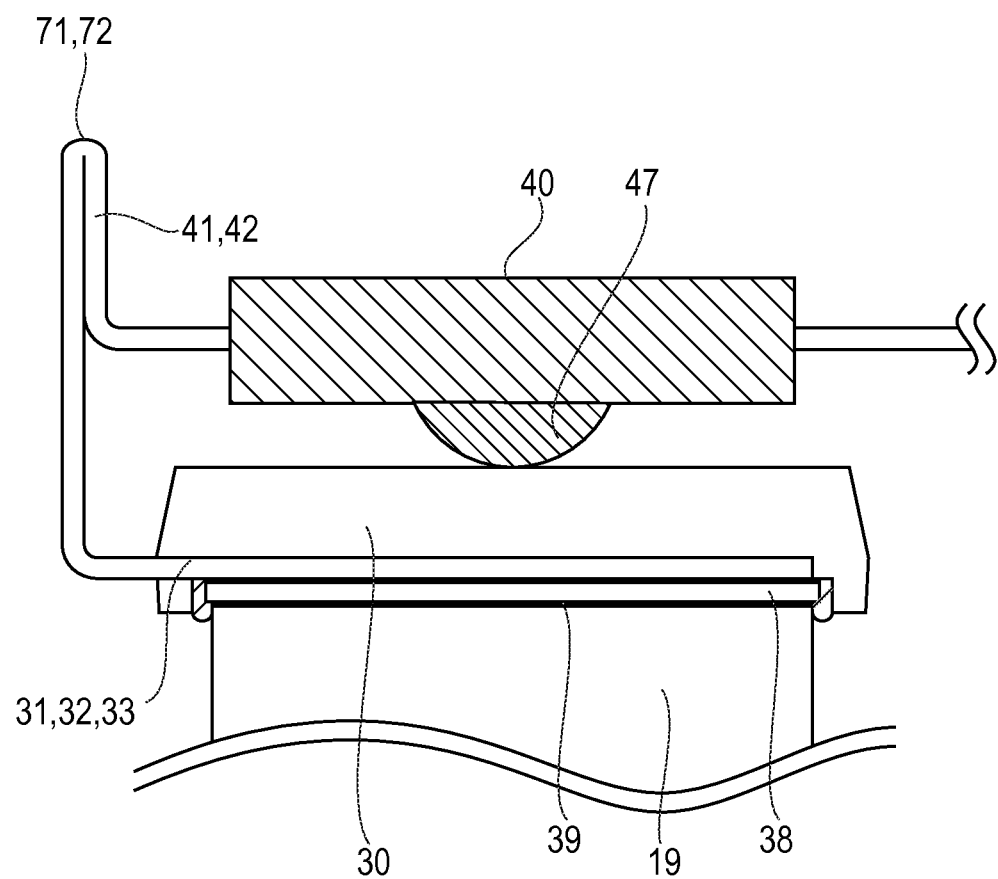
FIG. 9 is a partial cross section of a heat sink, a mold module, and a frame ASSY on section A-A of FIG. 3 to show a drive unit integrated rotating electrical machine according to a fifth embodiment of the invention.

A fifth embodiment of the invention will now be described using FIG. 9. FIG. 9 is a partial cross section of the heat sink, the mold module, and the frame ASSY on the section A-A of FIG. 3 and shows a drive unit coaxially integrated rotating electrical machine according to the fifth embodiment of the invention. The drive unit 8 uses a mold module for a power switching element FETps, a motor relay FETry, and a power supply relay RyM in each phase, that is, a phase U, a phase V, and a phase W. FIG. 9 shows a cross section of the phase V as a representative and omits cross sections of the other phases. It should be appreciated, however, that the other phases are of the same configuration as the phase V. In comparison with the counterparts of the first to third embodiments above, the drive unit coaxially integrated rotating electrical machine of the fifth embodiment is different in the configuration of a part described in the following.

In the fifth embodiment, mold module back surface protruding portions like those in the second embodiment above are not provided to the attachment surface to the heat sink 19 of the mold module 30 and an insulating plate 38 (for example, a ceramic plate) of a uniform thickness is provided between the mold modules 30 and the heat sink 19.

The terminal MB 31, the terminal MG 32, and the mold module motor terminal 33 of the mold module 30 are exposed to the attachment surface to the heat sink 19 of the mold module 30.

Heat conductive grease 39 is interposed between the mold module 30 and the insulating plate 38 and between the insulating plate 38 and the heat sink 19.

Owing to the insulating plate 38 of a uniform thickness, heat generated in a plurality of switching elements in the mold module 30 can be released homogeneously to the heat sink 19.

Also, variances in temperature among the respective switching elements can be lessened by making thermal resistances from the respective switching elements, which are power elements, such as FETs, to the heat sink 19 equal. It thus becomes possible to enhance an output and extend an operating time of the drive unit coaxially integrated rotating electrical machine.

Further, because the mold modules 30 and the heat sink 19 can be electrically isolated in a reliable manner by the insulating plate 38, insulation properties can be enhanced.

The above has described that the heat conductive grease 39 is provided to the both surfaces of the insulating plate. It should be appreciated, however, that resin is used instead.

The mold modules of the first to fifth embodiments have been described as the mold modules 30, each of which includes the power switching element FETps and the motor relay FETry to feed power to the motor in the form of a mold module. It should be appreciated, however, that the the mold modules are not limited to the mold modules 30. Advantages same as those described above can be obtained even in a case where the mold module is a mold module which includes the power-supply relay RyM that interrupts power feeding to the mold module at the occurrence of a failure or during a non-operating time in the form of a mold module.

The first to fifth embodiments above have described a coaxially integrated rotating electrical machine. However, the same can be said in a case where the drive unit is provided separately or attached to the side surface of the rotating electrical machine.

According to the first to fifth embodiments above, a plurality of mold modules are used in the coaxially integrated rotating electrical machine. In a case where the mold modules are arranged concentrically with the motor rotation shaft, the respective mold modules can be pressed more uniformly by the frame ASSY. Hence, this configuration is more advantageous in terms of vibration resistance.

In FIG. 1 to FIG. 6, the same reference numerals denote the same or equivalent portions.

As can be obvious from the description above and the drawings described above, FIG. 1 to FIG. 12 and the first to fifth embodiments have technical characteristics as follows.

Characteristic 1

A drive unit integrated rotating electrical machine includes a motor and a drive unit driving the motor under control and having a case structure formed of a metal heat sink and a housing, which are combined into one unit. The drive unit integrated rotating electrical machine is characterized as follows. That is, the drive unit of the drive unit integrated rotating electrical machine has power circuit components, and the power circuit components are a plurality of power switching elements FETps forming abridge circuit and motor relay switching elements FETry performing ON and OFF control of motor currents supplied to the motor from the respective power switching elements. The power circuit components are mounted on terminals, which are conductive members. The power circuit components and the terminals are molded into one unit with mold resin. The resulting mold modules have the terminals partially exposed to the outside of the mold resin for the purpose of connection. The mold modules are disposed between a frame ASSY in which power-supply terminals are insert-molded and the heat sink. In the drive unit configured in this manner, the mold modules are connected and coupled to the connection terminals of the frame ASSY and disposed on the heat sink.

Characteristic 2

The drive unit integrated rotating electrical machine described in Characteristic 1 is characterized in that the mold modules are firmly fixed to the heat sink with resin.

Characteristic 3

The drive unit integrated rotating electrical machine described in Characteristic 2 is characterized in that the mold modules and the heat sink have a clearance in between.

Characteristic 4

The drive unit integrated rotating electrical machine described in Characteristic 3 is characterized in that the mold modules are pressed by the frame.

Characteristic 5

The drive unit integrated rotating electrical machine described in Characteristic 4 is characterized in that protruding portions are provided by molding to heat sink attachment surfaces of the mold modules.

Characteristic 6

The drive unit integrated rotating electrical machine described in Characteristic 4 is characterized in that the resin includes fillers therein.

Characteristic 7

The drive unit integrated rotating electrical machine described in any one of Characteristics 4 to 6 is characterized in that elastic members are provided between the mold modules and the frame ASSY.

Characteristic 8

The drive unit integrated rotating electrical machine described in any one of Characteristics 4 to 6 is characterized in that protruding portions are provided to mold module pressing portions of the frame ASSY.

Characteristic 9

The drive unit integrated rotating electrical machine described in any one of Characteristics 3 to 8 is characterized in that electrodes are exposed on a side of a heat sink attachment surfaces of the mold modules.

Characteristic 10

The drive unit integrated rotating electrical machine described in Characteristic 9 is characterized in that the resin is hardening resin.

Characteristic 11

The drive unit integrated rotating electrical machine described in Characteristic 9 is characterized in that an insulating layer is provided to a mold module attachment surface of the heat sink.

Characteristic 12

The drive unit integrated rotating electrical machine described in Characteristic 1 is characterized in that an insulating plate is provided between the mold modules and the heat sink.

Characteristic 13

The drive unit integrated rotating electrical machine described in any one of Characteristics 2 to 4, 9, and 10 is characterized in that the resin is applied in an amount large enough to overflow from outer peripheries of the mold modules.

Characteristic 14

The drive unit integrated rotating electrical machine described in any one of Characteristics 1 to 13 is characterized in that a motor part and a drive unit part are combined sequentially from a speed reducer attachment side so as to form a coaxial integral structure.

Characteristic 15

The drive unit integrated rotating electrical machine described in any one of Characteristics 1 to 13 is characterized in that a drive unit part and a motor part are combined sequentially from a speed reducer attachment side so as to form a coaxial integral structure.

The invention claimed is:

1. A drive unit integrated rotating electrical machine including a motor, a drive unit driving the motor under control and provided with power switching elements, and a heat sink cooling the drive unit, which are combined into one unit, the drive unit integrated rotating electrical machine being characterized in that:
   the power switching elements are molded and formed into mold modules in a state in which terminals thereof are exposed;
   the mold modules are firmly fixed to the heat sink;
   conductors passing a current to the power switching elements are insert-molded in a frame in a state in which terminals thereof are exposed;
   the exposed terminals of the power switching elements are connected to the exposed terminals of the conductors; and
   the mold modules themselves with the power switching elements molded therein are pressed against the heat sink by pressing due to the frame.

2. The drive unit integrated rotating electrical machine according to claim 1, characterized in that:
   the mold modules are firmly fixed to the heat sink with resin.

3. The drive unit integrated rotating electrical machine according to claim 2, characterized in that:
   a clearance is formed between the mold modules and the heat sink and the resin is present in the clearance.

4. The drive unit integrated rotating electrical machine according to claim 3, characterized in that:
   protruding portions that form the clearance are provided to heat sink attachment surfaces of the mold modules.

5. The drive unit integrated rotating electrical machine according to claim 3, characterized in that:
   elastic members elastically pressing the mold modules against the heat sink are provided between the mold modules and the frame.

6. The drive unit integrated rotating electrical machine according to claim 3, characterized in that:
   protruding portions pressing the mold modules on the frame against the heat sink are provided.

7. The drive unit integrated rotating electrical machine according to claim 3, characterized in that:
   electrodes of the mold modules are exposed on a side of a heat sink attachment surface.

8. The drive unit integrated rotating electrical machine according to claim 3, characterized in that:
   the resin is hardening resin.

9. The drive unit integrated rotating electrical machine according to claim 3, characterized in that:
   an insulating layer is provided to a mold module attachment surface of the heat sink.

10. The drive unit integrated rotating electrical machine according to claim 2, characterized in that:
    the resin includes fillers therein.

11. The drive unit integrated rotating electrical machine according to claim 2, characterized in that:
    the resin includes fillers therein.

12. The drive unit integrated rotating electrical machine according to claim 11, characterized in that:
    elastic members elastically pressing the mold modules against the heat sink are provided between the mold modules and the frame.

13. The drive unit integrated rotating electrical machine according to claim 11, characterized in that:
    protruding portions pressing the mold modules on the frame against the heat sink are provided.

14. The drive unit integrated rotating electrical machine according to claim 13, characterized in that:
    electrodes of the mold modules are exposed on a side of a heat sink attachment surface.

15. The drive unit integrated rotating electrical machine according to claim 14, characterized in that:
    the resin is hardening resin.

16. The drive unit integrated rotating electrical machine according to claim 15, characterized in that:
    the resin overflows from outer peripheries of the mold modules.

17. The drive unit integrated rotating electrical machine according to claim 16, characterized in that:
    a motor part and a drive unit part are combined sequentially from a speed reducer attachment side so as to form a coaxial integral structure.

18. The drive unit integrated rotating electrical machine according to claim 16, characterized in that:
    a drive unit part and a motor part are combined sequentially from a speed reducer attachment side so as to form a coaxial integral structure.

19. The drive unit integrated rotating electrical machine according to claim 13, characterized in that:
    an insulating layer is provided to a mold module attachment surface of the heat sink.

20. The drive unit integrated rotating electrical machine according to claim 2, characterized in that:
    the resin overflows from outer peripheries of the mold modules.

21. The drive unit integrated rotating electrical machine according to claim 1, characterized in that:
   an insulating plate is provided between the mold modules and the heat sink.

22. The drive unit integrated rotating electrical machine according to claim 1, characterized in that:
   a motor part and a drive unit part are combined sequentially from a speed reducer attachment side so as to form a coaxial integral structure.

23. The drive unit integrated rotating electrical machine according to claim 1, characterized in that:
   a drive unit part and a motor part are combined sequentially from a speed reducer attachment side so as to form a coaxial integral structure.

* * * * *